United States Patent
Koyanagi et al.

(10) Patent No.: US 9,564,808 B2
(45) Date of Patent: Feb. 7, 2017

(54) ELECTRIC POWER CONVERSION DEVICE

(71) Applicants: Mitsubishi Electric Corporation, Chiyoda-ku (JP); Toshiba Mitsubishi-Electric Industrial Systems Corporation, Chuo-ku (JP)

(72) Inventors: Kimiyuki Koyanagi, Chiyoda-ku (JP); Takushi Jimichi, Chiyoda-ku (JP); Satoshi Azuma, Chiyoda-ku (JP); Yasuhiko Hosokawa, Chuo-ku (JP); Shinzo Tamai, Chuo-ku (JP); Sadao Funahashi, Chuo-ku (JP); Kotaro Higashi, Chuo-ku (JP)

(73) Assignees: Mitsubishi Electric Corporation, Chiyoda-ku (JP); Toshiba Mitsubishi-Electric Industrial Systems Corporation, Chuo-ku (JP)

( * ) Notice: Subject to any disclaimer, the term of this patent is extended or adjusted under 35 U.S.C. 154(b) by 66 days.

(21) Appl. No.: 14/650,741

(22) PCT Filed: Sep. 2, 2013

(86) PCT No.: PCT/JP2013/073516
§ 371 (c)(1),
(2) Date: Jun. 9, 2015

(87) PCT Pub. No.: WO2014/091801
PCT Pub. Date: Jun. 19, 2014

(65) Prior Publication Data
US 2016/0190924 A1    Jun. 30, 2016

(30) Foreign Application Priority Data
Dec. 12, 2012  (JP) .................................. 2012-271250

(51) Int. Cl.
*G05F 1/00*  (2006.01)
*H02M 3/158*  (2006.01)
(Continued)

(52) U.S. Cl.
CPC ............. *H02M 3/158* (2013.01); *H02M 7/483* (2013.01); *H02M 1/0845* (2013.01); *H02M 2007/4835* (2013.01)

(58) Field of Classification Search
CPC .... H02M 3/158; H02M 7/483; H02M 1/0845; H02M 2007/4835; H02M 1/00; H02M 2001/0062; H02M 2001/007; H02M 2001/0077; H02M 2001/325; H02M 2001/0067; H02M 1/32
(Continued)

(56) References Cited

U.S. PATENT DOCUMENTS

| 5,587,648 | A | * | 12/1996 | Jinbo | ..................... | G11O 5/147 |
| | | | | | | 323/269 |
| 8,526,229 | B2 | * | 9/2013 | Takahashi | .............. | G11O 5/147 |
| | | | | | | 365/182 |
| 2012/0026767 | A1 | * | 2/2012 | Inoue | .................... | H02M 7/217 |
| | | | | | | 363/89 |

FOREIGN PATENT DOCUMENTS

| CN | 102771038 A | 11/2012 |
| EP | 2 549 634 A1 | 1/2013 |

(Continued)

OTHER PUBLICATIONS

International Search Report Issued Nov. 26, 2013 in PCT/JP13/073516 Filed Sep. 2, 2013.

*Primary Examiner* — Jessica Han
*Assistant Examiner* — Lorena Bruner
(74) *Attorney, Agent, or Firm* — Oblon, McClelland, Maier & Neustadt, L.L.P.

(57) ABSTRACT

An electric power conversion device includes a plurality of cell converters connected in cascade and including main
(Continued)

circuits, drive circuits, and self-feeding devices for supplying power to the drive circuits by being supplied with power from the main circuits. The drive circuit is supplied with power via a first feed line from the self-feeding device in the corresponding cell converter, and supplied with power from the self-feeding device in another cell converter via a second feed line on which an insulation input/output circuit is provided. When the self-feeding device is abnormal, the drive circuit is supplied with power from the self-feeding device in the other cell converter, whereby the electric power conversion device continuously provides a desired output.

14 Claims, 4 Drawing Sheets

(51) Int. Cl.
    *H02M 7/483* (2007.01)
    *H02M 1/084* (2006.01)
(58) Field of Classification Search
    USPC .......................................................... 323/271
    See application file for complete search history.

(56) References Cited

FOREIGN PATENT DOCUMENTS

| | | |
|---|---|---|
| JP | 2011-193615 A | 9/2011 |
| WO | 2011/114816 A1 | 9/2011 |

\* cited by examiner

ELECTRIC POWER CONVERSION DEVICE

TECHNICAL FIELD

The present invention relates to an electric power conversion device having a plurality of cell converters connected in cascade, each of which has a semiconductor switching element, and particularly, to an electric power conversion device having cell converters each having a self-feeding device for supplying power to a drive circuit for a semiconductor switching element.

BACKGROUND ART

A modular multilevel converter (MMC) is a circuit configuration that uses a switching element such as Insulated Gate Bipolar Transistor (IGBT) for which ON/OFF control can be performed, and is capable of outputting voltage equal to or higher than withstand voltage of the switching element. This circuit configuration is expected to be applied to a DC transmission system (HVDC), a static synchronous compensator (STATCOM), and the like.

Conventional electric power conversion devices are applicable to the MMC, and are composed of a plurality of cell converters connected in cascade. A main circuit of each cell converter is a bidirectional chopper circuit composed of a high-voltage-side switching element, a low-voltage-side switching element, and a DC capacitor. Each cell converter has a cell control circuit and a self-feed power supply. The self-feed power supply is connected in parallel to the DC capacitor, and is supplied with power from the DC capacitor.

A short-circuit switch is connected in parallel to output of the cell converter, and drive power for the short-circuit switch is supplied from the self-feed power supply. The short-circuit switch is means for short-circuiting output of the cell converter when the cell converter has failed, and is a NORMALLY-ON switch which short-circuits output of the cell converter when no drive power is supplied from the self-feed power supply. When the self-feed power supply has stopped, output of an abnormal cell converter is short-circuited by the short-circuit switch. Therefore, even if a cell converter has failed, the system can continue its operation (for example, Patent Document 1).

CITATION LIST

Patent Document

Patent Document 1: Japanese Laid-Open Patent Publication No. 2011-193615

SUMMARY OF THE INVENTION

Problems to be Solved by the Invention

In conventional electric power conversion devices, when the self-feed power supply has stopped, output of an abnormal cell converter is short-circuited by the short-circuit switch. Therefore, output voltage of the electric power conversion device having a plurality of cell converters connected in cascade reduces, resulting in a problem that a desired output cannot be obtained. Even if the circuit is configured to have redundancy, the same problem arises when self-feed power supplies equal to or more than a number corresponding to the redundancy have stopped and the corresponding cell converters are short-circuited, and in addition, the circuit configuration is complicated.

The present invention has been made to solve the above problems, and an object of the present invention is to provide an electric power conversion device that has a circuit configuration in which a plurality of cell converters each having a self-feeding device are connected in cascade and is capable of continuously providing a desired output even when the self-feeding device is abnormal.

Solution to the Problems

An electric power conversion device according to the present invention includes a plurality of cell converters connected in cascade, the plurality of cell converters each including: a main circuit having a semiconductor switching element and a capacitor; a drive circuit for driving the semiconductor switching element; and a self-feeding device for supplying power to the drive circuit by being supplied with power from the main circuit. A first feed line and a second feed line for supplying power are connected to each self-feeding device. Each drive circuit can be supplied with power via the first feed line from the self-feeding device in the corresponding cell converter, and can be supplied with power via the second feed line from the self-feeding device in another cell converter.

Effect of the Invention

Since the electric power conversion device according to the present invention is configured as described above, when a self-feeding device of a cell converter is abnormal, a drive circuit for the cell converter can be supplied with power from a self-feeding device of another cell converter, whereby a desired output can be continuously obtained and operation can be continued with high reliability.

DESCRIPTION OF EMBODIMENTS

Embodiment 1

Hereinafter, an electric power conversion device according to embodiment 1 of the present invention will be described based on the drawings.

Figure 1:
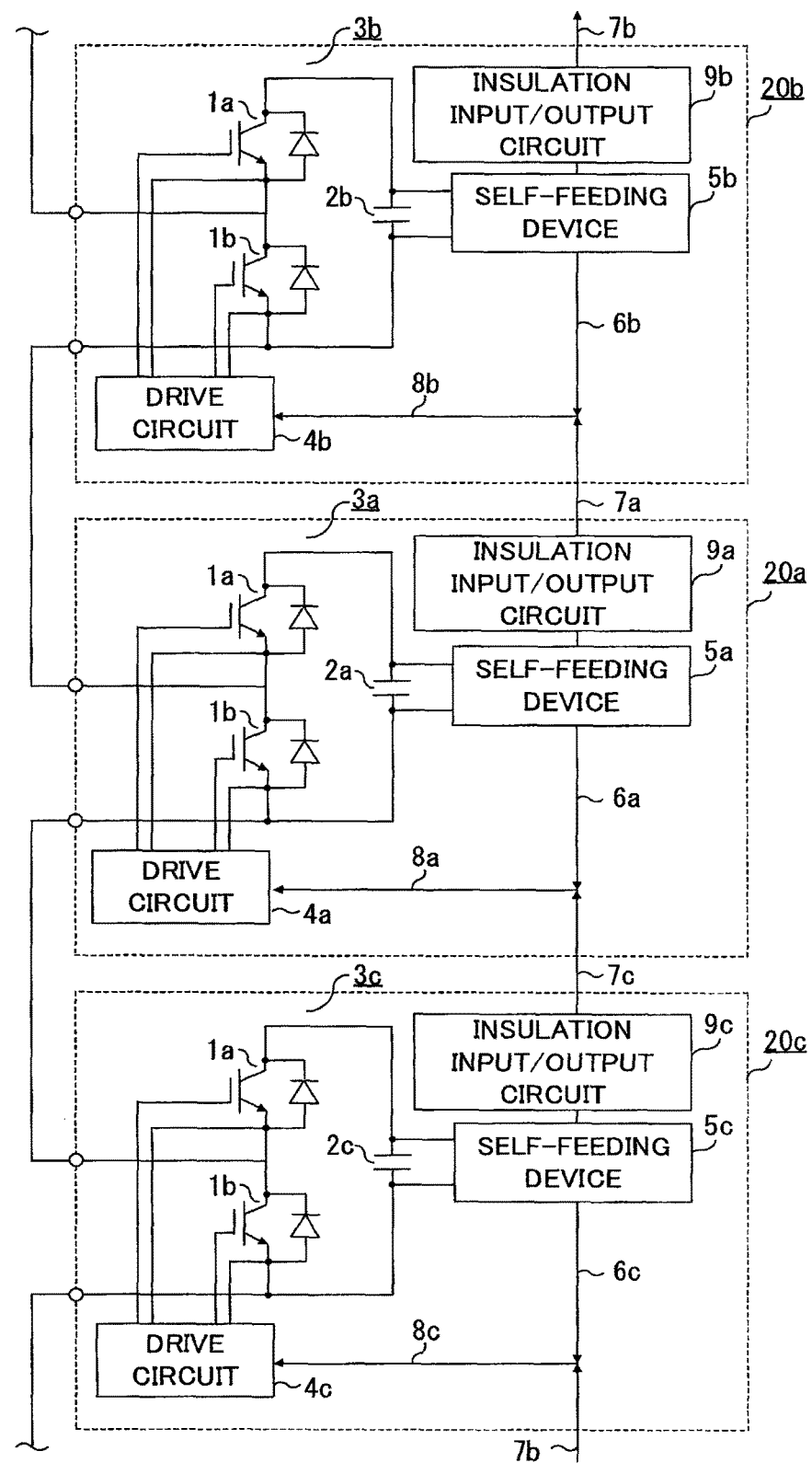
FIG. 1 is a diagram showing the configuration of an electric power conversion device according to embodiment 1 of the present invention.

FIG. 1 is a diagram showing the configuration of the electric power conversion device according to embodiment 1 of the present invention. As shown in FIG. 1, the electric power conversion device is composed of a plurality of cell converters 20a to 20c connected in cascade. That is, output terminals of the plurality of cell converters 20a to 20c are connected in series. Although only the cell converter 20a will be described in detail here, the cell converters 20a to 20c have the same configuration.

The cell converter 20a has, as a main circuit 3a, a chopper circuit in which a capacitor 2a is connected in parallel to a series circuit formed by two semiconductor switching elements 1a and 1b such as IGBT connected in series. A connection point between the high-voltage-side semiconductor switching element 1a and the low-voltage-side semiconductor switching element 1b, and a connection point between the low-voltage-side semiconductor switching element 1b and the capacitor 2a serve as two output terminals of the cell converter 20a.

Each of the semiconductor switching elements 1a and 1b is provided with a diode connected in antiparallel thereto. For the semiconductor switching elements 1a and 1b, other semiconductor switching elements such as MOSFET may be used instead of IGBT.

The plurality of cell converters 20a to 20c are connected in cascade via the output terminals of the cell converters 20a to 20c, and the electric power conversion device can output voltage equal to or higher than withstand voltages of the semiconductor switching elements 1a and 1b.

In addition, the cell converter 20a has a drive circuit 4a for providing a gate signal to a gate electrode of each of the semiconductor switching elements 1a and 1b, and a self-feeding device 5a for supplying power to the drive circuit 4a, that is, supplying drive power for each of the semiconductor switching elements 1a and 1b.

A first feed line 6a and a second feed line 7a are connected to the self-feeding device 5a. On the second feed line 7a, an insulation input/output circuit 9a described later is provided. A gate feed line 8a is connected to the drive circuit 4a.

Voltage of the capacitor 2a of the main circuit 3a increases by current flowing into the capacitor 2a, and accumulates. The self-feeding device 5a has a DC/DC power conversion section, and receives voltage of the capacitor 2a from both ends of the capacitor 2a, to perform DC/DC power conversion. The self-feeding device 5a thus converts the voltage to a voltage value appropriate for a power supply for the drive circuit 4a, and outputs the converted voltage to the first and second feed lines 6a and 7a.

As in the cell converter 20a, the other cell converters 20b and 20c also have main circuits 3b and 3c, drive circuits 4b and 4c, self-feeding devices 5b and 5c, first feed lines 6b and 6c, second feed lines 7b and 7c, gate feed lines 8b and 8c, and insulation input/output circuits 9b and 9c, respectively.

The first feed line 6a is a feed line for the self-feeding device 5a to supply power to the drive circuit 4a of the corresponding cell converter 20a. The second feed line 7a is a feed line for the self-feeding device 5a to supply power to the drive circuit 4b of the adjacent cell converter 20b, and is connected into the adjacent cell converter 20b via the insulation input/output circuit 9a.

From another adjacent cell converter 20c opposite to the cell converter 20b, the second feed line 7c is connected into the cell converter 20a via the insulation input/output circuit 9c. Power supplied via the first feed line 6a and power supplied via the second feed line 7c from the self-feeding device 5c of the adjacent cell converter 20c are connected to the drive circuit 4a via the gate feed line 8a.

Thus, the drive circuit 4a is supplied with power from both of the self-feeding device 5a of the corresponding cell converter 20a and the self-feeding device 5c of the adjacent cell converter 20c.

The drive circuit 4b of the cell converter 20b is supplied with power via the first feed line 6b from the self-feeding device 5b in the cell converter 20b, and supplied with power via the second feed line 7a from the self-feeding device 5a in the cell converter 20a adjacent to the cell converter 20b.

In the case where the number of the plurality of cell converters 20a to 20c in the electric power conversion device is three, the cell converter 20b and the cell converter 20c are at both ends of cascade connection. In this case, from the cell converter 20b, the second feed line 7b is connected into the cell converter 20c via the insulation input/output circuit 9b. In the cell converter 20c, power supplied via the first feed line 6c and power supplied via the second feed line 7b from the cell converter 20b are connected to the drive circuit 4c.

The second feed line 7a is used for the self-feeding device 5a to supply power to the drive circuit 4b of the adjacent cell converter 20b, and allows power feeding between the two cell converters 20a and 20b. The insulation input/output circuit 9a provided on the second feed line 7a of the self-feeding device 5a has a dielectric strength equal to or greater than a potential difference between the cell converters 20a and 20b which perform power feeding therebetween, and is formed by an isolation transformer or the like.

Since the plurality of cell converters 20a to 20c are connected in cascade, reference potentials of the main circuits 3a to 3c are different. Therefore, if feed voltage converted from voltage accumulated in the capacitor 2 of the main circuit 3c of another cell converter 20c is directly provided to the drive circuit 4a of the cell converter 20a, the drive circuit 4a might be damaged by overvoltage being applied thereto.

In the present embodiment, since the insulation input/output circuit 9a having a dielectric strength equal to or greater than a potential difference between the cell converters which perform power feeding therebetween is provided on the second feed line 7a, power supply voltage supplied to the drive circuit 4b via the second feed line 7a becomes voltage appropriate for the drive circuit 4b.

The same holds true for the insulation input/output circuits 9b and 9c.

The electric power conversion device according to the present embodiment is configured as described above, so that, even if any of the self-feeding devices 5 (5a to 5c) of the cell converters 20 (20a to 20c) has stopped, since power is supplied to the drive circuit 4 (4a to 4c) also from the self-feeding device 5 of another cell converter 20, the main circuit 3 (3a to 3c) can be continuously driven while being supplied with drive power. Therefore, it is not necessary to short-circuit output of the main circuit 3 because of abnormality of the self-feeding device 5, and the electric power conversion device can reliably continue its operation with a desired output without causing output reduction.

It is noted that the electric power conversion device has a control circuit (not shown) for generating gate signals to the respective semiconductor switching elements 1a and 1b of the main circuit 3, and normally, also has a power supply for the control circuit. However, the self-feeding device 5 of the cell converter 20 may supply power to the control circuit.

Figure 2:
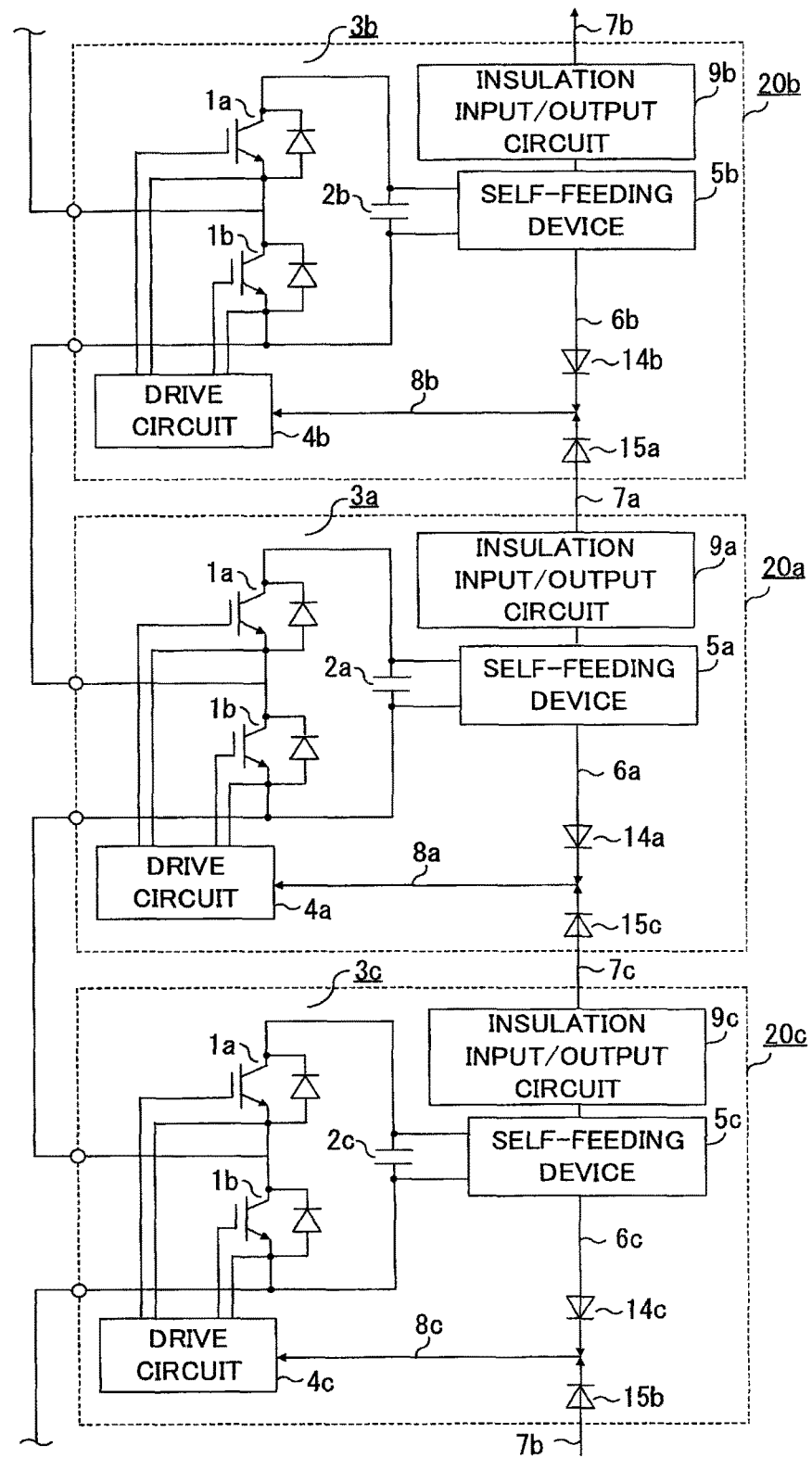
FIG. 2 is a diagram showing the configuration of an electric power conversion device according to another example of embodiment 1 of the present invention.

As shown in FIG. 2, a head-to-head diode configuration may be employed in which, on the first feed line 6a, a first diode 14a is connected which allows current toward the gate feed line 8a to pass and blocks current from the second feed line 7c, and on the second feed line 7c, a second diode 15c is connected which allows current toward the gate feed line 8a to pass and blocks current from the first feed line 6a. Thus, current is prevented from flowing between the first feed line 6a and the second feed line 7c. In this manner, the cell converters 20 (20a to 20c) may have first diodes 14a to 14c and second diodes 15a to 15c, respectively, to form the head-to-head diode configurations, whereby each of the self-feeding devices 5a to 5c is prevented from being charged by the other self-feeding devices 5a to 5c.

Embodiment 2

Figure 3:
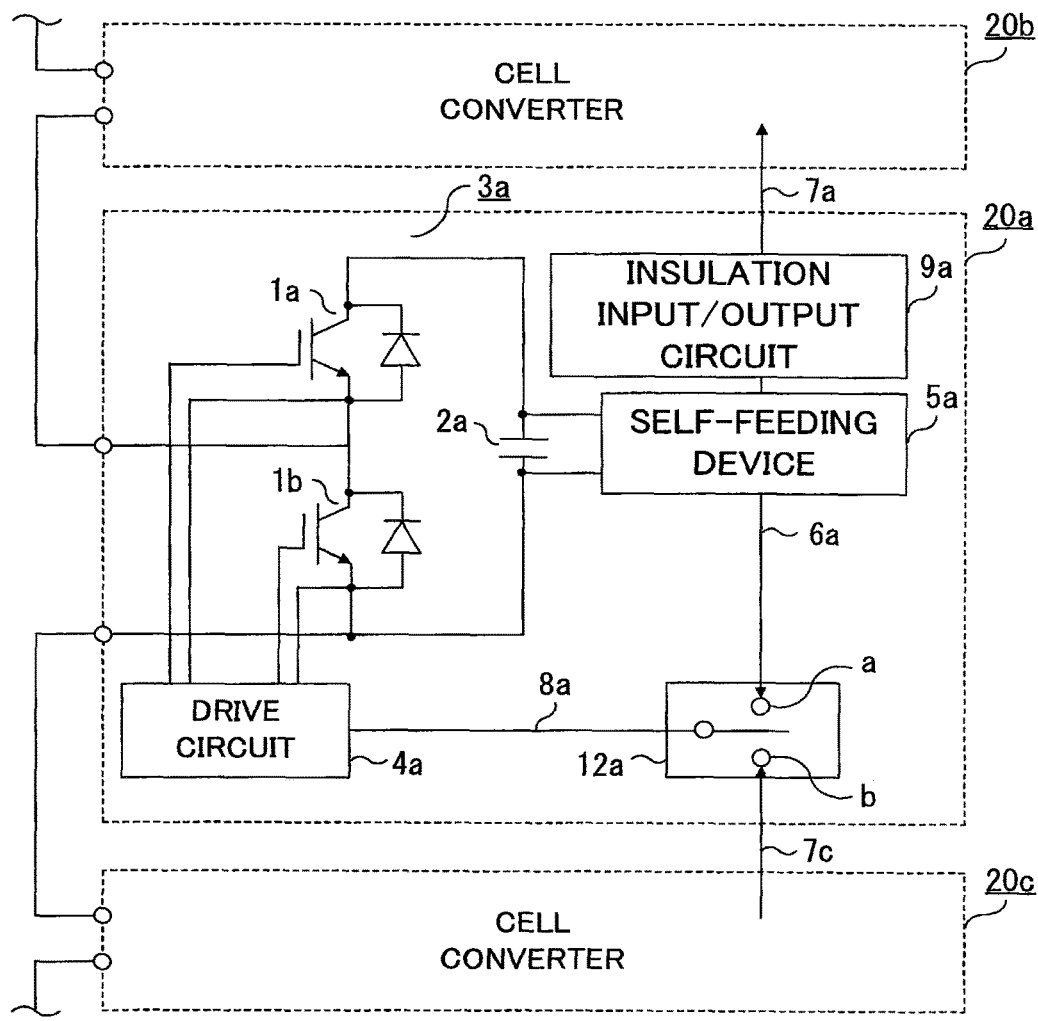
FIG. 3 is a diagram showing the configuration of an electric power conversion device according to embodiment 2 of the present invention.

FIG. 3 is a diagram showing the configuration of an electric power conversion device according to embodiment 2 of the present invention.

In the above embodiment 1, the drive circuit 4a is supplied with power from both of the self-feeding device 5a of the corresponding cell converter 20a and the self-feeding device 5c of the adjacent cell converter 20c. On the other hand, in the present embodiment 2, a switch 12a is provided for switching a feed line leading to the drive circuit 4a between the first feed line 6a and the second feed line 7c. The other configuration is the same as in the above embodiment 1.

The other cell converters 20b and 20c are the same as the cell converter 20a, and have switches 12b and 12c to perform the same operations, though not shown in the drawings for convenience sake.

As shown in FIG. 3, in the cell converter 20a, the switch 12a selects one of the first feed line 6a and the second feed line 7c on an input side, and connects the selected one to the gate feed line 8a on an output side. Thus, the drive circuit 4a is supplied with power via the first feed line 6a from the self-feeding device 5a, or via the second feed line 7c from the self-feeding device 5c of the adjacent cell converter 20c. Specifically, the switch 12a performs a switch operation so as to select the first feed line 6a in a normal case, and select the second feed line 7c when operation of the self-feeding device 5a of the corresponding cell converter 20a is abnormal.

The switch 12a is switched between a contact a on the first feed line 6a side and a contact b on the second feed line 7c side, and has a NORMALLY-ON switch formed by a high-speed semiconductor switching element on the contact b side, and a normal switch (NORMALLY-OFF type) on the contact a side.

The switch 12a selects the contact a, whereby power is supplied from the self-feeding device 5a via the first feed line 6a. When the power feeding via the first feed line 6a is stopped because of abnormality of the self-feeding device 5a, the switch 12a is automatically switched to the contact b. As a result, the power feeding is shifted to power feeding via the second feed line 7c from the self-feeding device 5c of the other cell converter 20c.

In this case, power for the switch 12a is supplied from the self-feeding device 5a. If voltage from the self-feeding device 5a reduces so that operation cannot be performed, the switch on the contact a side is turned off, and the NORMALLY-ON switch on the contact b side is automatically turned on and is connected via the second feed line 7c to the self-feeding device 5c of the other cell converter 20c. If voltage from the self-feeding device 5a of the corresponding cell converter 20a becomes sufficiently high, conversely, the switch on the contact a side is turned on and the NORMALLY-ON switch on the contact b side is turned off.

In the present embodiment, even if any of the self-feeding devices 5 of the cell converters 20 has stopped, power feeding is automatically switched so that the drive circuit 4 is supplied with power from the self-feeding device 5 of another cell converter 20, whereby the main circuit 3 can be continuously driven. Therefore, as in the above embodiment 1, it is not necessary to short-circuit output of the main circuit 3 because of abnormality of the self-feeding device 5, and the electric power conversion device can reliably continue its operation with a desired output without causing output reduction.

When the switch 12 (12a to 12c) is switched, power feeding to the drive circuit 4 is interrupted momentarily. However, if the NORMALLY-ON switch on the contact b side and the switch on the contact a side are formed by semiconductor switching elements such as IGBT or MOSFET which perform high-speed switching operations, the momentary interruption of power feeding can be suppressed enough that control of the electric power conversion device is not influenced.

Embodiment 3

Figure 4:
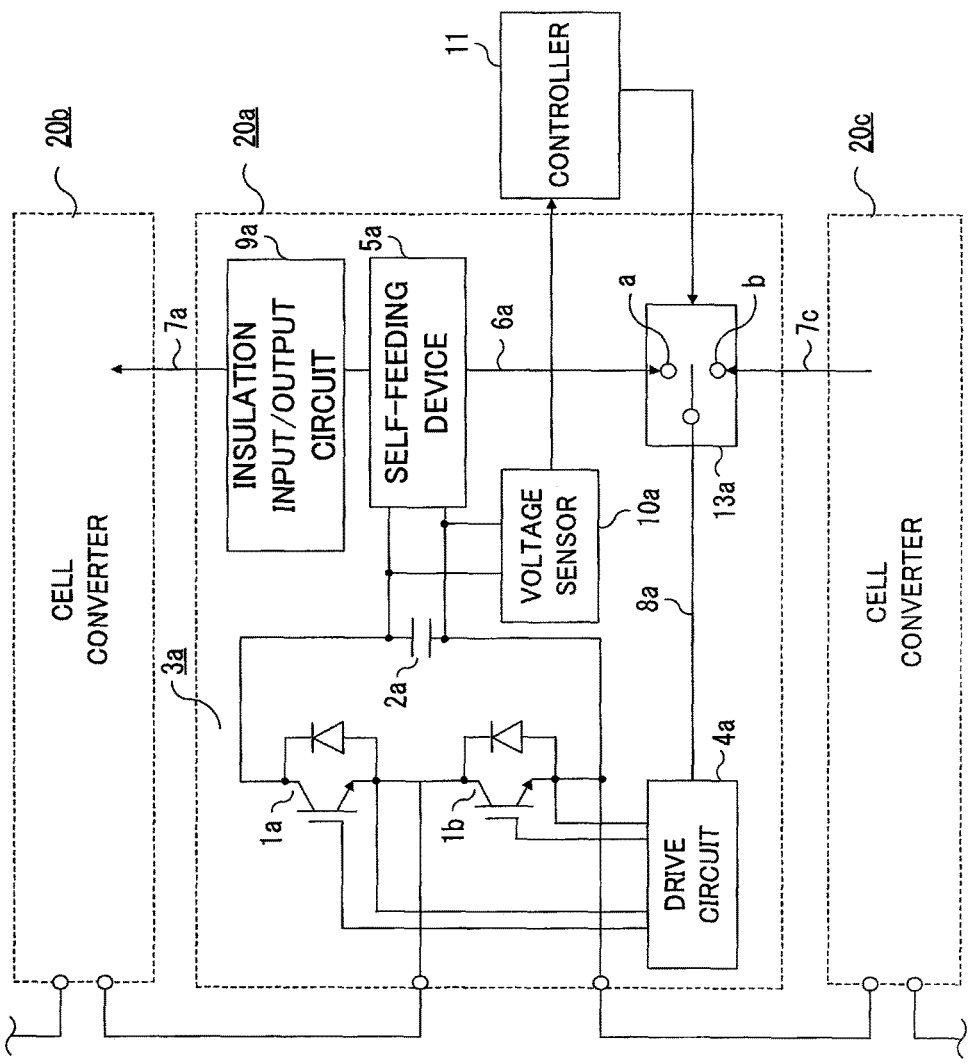
FIG. 4 is a diagram showing the configuration of an electric power conversion device according to embodiment 3 of the present invention.

FIG. 4 is a diagram showing the configuration of an electric power conversion device according to embodiment 3 of the present invention.

In the above embodiment 2, the switch 12 is automatically switched. On the other hand, in the present embodiment 3, switches 13 (13a to 13c) are provided for which switching is controlled from the outside.

As shown in FIG. 4, the cell converter 20a includes: a switch 13a; a voltage sensor 10a connected to both ends of the capacitor 2a, for detecting voltage of the capacitor 2a; and a controller 11 for operating the switch 13a in accordance with a voltage value detected by the voltage sensor 10a. In this case, the controller 11 is provided outside the cell converter 20a, and drives the switch 13a by being supplied with power from means other than the self-feeding device 5a. The other configuration is the same as in the above embodiment 2.

The other cell converters 20b and 20c are the same as the cell converter 20a, and have switches 13b and 13c, voltage sensors 10b and 10c, and controllers 11, respectively, to perform the same operations, though not shown in the drawings for convenience sake. One common controller 11 may be provided for the plurality of cell converters 20.

In the cell converter 20a, if voltage of the capacitor 2a detected by the voltage sensor 10a is higher than a prescribed value, the controller 11 controls the switch 13a so as to select the contact a, whereby the drive circuit 4a is supplied with power via the first feed line 6a from the self-feeding device 5a. If voltage of the capacitor 2a detected by the voltage sensor 10a becomes equal to or smaller than the prescribed value, the controller 11 controls the switch 13a so as to be switched from the contact a to the contact b. Thus, the switch 13a is switched so that the drive circuit 4a is supplied with power via the second feed line 7c from the self-feeding device 5c of the other cell converter 20c.

Also in the present embodiment, even if any of the self-feeding devices 5 of the cell converters 20 has stopped, power feeding is switched so that the drive circuit 4 is supplied with power from the self-feeding device 5 of another cell converter 20, whereby the main circuit 3 can be continuously driven. Therefore, as in the above embodiments 1 and 2, it is not necessary to short-circuit output of the main circuit 3 because of abnormality of the self-feeding device 5, and the electric power conversion device can reliably continue its operation with a desired output without causing output reduction.

In the above embodiments, each of the insulation input/output circuits 9 (9a to 9c) on the second feed lines 7 (7a to 7c) is provided in the corresponding cell converter 20 that is to supply power. However, each insulation input/output circuit 9 may be provided in the other cell converter 20 that is to be supplied with power.

It is noted that, within the scope of the present invention, the above embodiments may be freely combined with each other, or each of the above embodiments may be modified or abbreviated as appropriate.

The invention claimed is:

1. An electric power conversion device comprising a plurality of cell converters connected in cascade, the plurality of cell converters each including:
   a main circuit having a semiconductor switching element and a capacitor;
   a drive circuit for driving the semiconductor switching element; and
   a self-feeding device for supplying power to the drive circuit by being supplied with power from the main circuit, wherein
   to each self-feeding device, a first feed line for supplying power to the drive circuit in the corresponding cell converter and a second feed line for supplying power to the drive circuit in another cell converter are connected, and
   each drive circuit can be supplied with power via the first feed line from the self-feeding device in the corresponding cell converter, and can be supplied with power via the second feed line from the self-feeding device in the other cell converter.

2. The electric power conversion device according to claim 1, wherein, on each second feed line, an insulation input/output circuit is provided which has a dielectric strength equal to or greater than a potential difference between two cell converters one of which is to supply power via the second feed line and the other one of which is to be supplied with power via the second feed line.

3. The electric power conversion device according to claim 2, wherein each cell converter further includes a switch for, when operation of the self-feeding device in the cell converter is abnormal, switching a feed line leading to the drive circuit, from the first feed line to the second feed line, the switching allowing the drive circuit to be supplied with power via the second feed line from the self-feeding device in the other cell converter.

4. The electric power conversion device according to claim 3, wherein the switch includes a NORMALLY-ON switch which is automatically switched to a second feed line side when power feeding from the first feed line has stopped.

5. The electric power conversion device according to claim 4, wherein the NORMALLY-ON switch is formed by a semiconductor switching element.

6. The electric power conversion device according to claim 3, further comprising:
   a voltage sensor for detecting voltage of the capacitor in each main circuit; and
   a controller for operating each switch in accordance with voltage of the capacitor.

7. The electric power conversion device according to claim 2, wherein each drive circuit is supplied with power from both of the self-feeding device in the corresponding cell converter and the self-feeding device in the other cell converter.

8. The electric power conversion device according to claim 2, wherein a first diode for preventing reverse current is connected on each first feed line, and a second diode for preventing reverse current is connected on each second feed line, thereby preventing current from flowing between the first feed line and the second feed line.

9. The electric power conversion device according to claim 1, wherein each cell converter further includes a switch for, when operation of the self-feeding device in the cell converter is abnormal, switching a feed line leading to the drive circuit, from the first feed line to the second feed line, the switching allowing the drive circuit to be supplied with power via the second feed line from the self-feeding device in the other cell converter.

10. The electric power conversion device according to claim 9, wherein the switch includes a NORMALLY-ON switch which is automatically switched to a second feed line side when power feeding from the first feed line has stopped.

11. The electric power conversion device according to claim 10, wherein the NORMALLY-ON switch is formed by a semiconductor switching element.

12. The electric power conversion device according to claim 9, further comprising:
   a voltage sensor for detecting voltage of the capacitor in each main circuit; and
   a controller for operating each switch in accordance with voltage of the capacitor.

13. The electric power conversion device according to claim 1, wherein each drive circuit is supplied with power from both of the self-feeding device in the corresponding cell converter and the self-feeding device in the other cell converter.

14. The electric power conversion device according to claim 1, wherein a first diode for preventing reverse current is connected on each first feed line, and a second diode for preventing reverse current is connected on each second feed line, thereby preventing current from flowing between the first feed line and the second feed line.

* * * * *